US011490610B2

(12) United States Patent
Towne

(10) Patent No.: US 11,490,610 B2
(45) Date of Patent: Nov. 8, 2022

(54) REFLECTIVE SPINNING BIRD DETERRENT

(71) Applicant: KNESS MFG. CO., INC., Albia, IA (US)

(72) Inventor: Dennis Towne, Warrensburg, MO (US)

(73) Assignee: Kness Mfg. Co., Inc., Albia, IA (US)

( * ) Notice: Subject to any disclaimer, the term of this patent is extended or adjusted under 35 U.S.C. 154(b) by 211 days.

(21) Appl. No.: 16/696,100

(22) Filed: Nov. 26, 2019

(65) Prior Publication Data

US 2020/0163324 A1 May 28, 2020

Related U.S. Application Data

(60) Provisional application No. 62/772,438, filed on Nov. 28, 2018.

(51) Int. Cl.
| | |
|---|---|
| *A01M 29/10* | (2011.01) |
| *A01M 29/08* | (2011.01) |
| *H02S 40/22* | (2014.01) |
| *F21V 7/05* | (2006.01) |
| *F21S 9/03* | (2006.01) |
| *F21S 10/00* | (2006.01) |
| *H02S 40/38* | (2014.01) |

(52) U.S. Cl.
CPC .......... *A01M 29/08* (2013.01); *A01M 29/10* (2013.01); *F21S 9/037* (2013.01); *F21S 10/00* (2013.01); *F21V 7/05* (2013.01); *H02S 40/22* (2014.12); *H02S 40/38* (2014.12)

(58) Field of Classification Search
CPC ......... A01M 29/08; A01M 29/10; F21S 9/037
See application file for complete search history.

(56) References Cited

U.S. PATENT DOCUMENTS

| | | | | |
|---|---|---|---|---|
| 1,380,325 | A | | 5/1921 | Schlirf |
| 1,566,739 | A | * | 12/1925 | Estes .................. G09F 7/22 |
| | | | | 40/479 |
| 2,795,894 | A | | 6/1957 | Hughes |
| 3,786,583 | A | * | 1/1974 | Revor .................. G01P 5/06 |
| | | | | 40/479 |
| 4,109,605 | A | | 8/1978 | Bachli |
| 6,351,908 | B1 | | 3/2002 | Thomas |
| 6,557,482 | B1 | | 5/2003 | Doty, III et al. |
| 2010/0236470 | A1 | * | 9/2010 | Doty, III .............. A01M 29/06 |
| | | | | 116/22 A |
| 2013/0014692 | A1 | | 1/2013 | Lee |

FOREIGN PATENT DOCUMENTS

| | | | |
|---|---|---|---|
| CN | 204014877 U | * | 12/2014 |
| CN | 106106430 A | * | 11/2016 |
| CN | 107279125 A | * | 10/2017 |
| CN | 109662089 A | * | 4/2019 |
| JP | 06181672 | | 7/1994 |

* cited by examiner

*Primary Examiner* — Julie A Bannan
(74) *Attorney, Agent, or Firm* — Nyemaster Goode P.C.

(57) ABSTRACT

A reflective bird deterrent, having a base, a center post attached to and extending up from the base, and first and second spinner assemblies having a plurality of fins rotatably attached to the center post. The plurality of fins on the first spinner are angled such that they spin in the opposite direction of the plurality of fins on the second spinner, and the plurality of fins on the first spinner and the plurality of fins on the second spinner are reflective.

2 Claims, 8 Drawing Sheets

REFLECTIVE SPINNING BIRD DETERRENT

CROSS-REFERENCE TO RELATED APPLICATION

This application claims priority to U.S. Provisional Patent Application Ser. No. 62/772,438, filed on Nov. 28, 2018, entitled "REFLECTIVE SPINNING BIRD DETERRENT," the disclosure of which is hereby incorporated herein by reference in its entirety.

BACKGROUND

Birds can be a nuisance that prevents people from enjoying being outdoors at their home or business. They can also cause damage to buildings and create issues with other things around the curtilage of a home or business. For this reason, people have been designing and placing bird deterrents that create visual cues to birds that are disorienting or that give them a sense of danger.

It may be intended to use humanitarian methods of keeping birds and other small animals away from certain areas, such as gardens, farms, or any other places where animals may pose risks.

SUMMARY

One aspect of the present disclosure includes a reflective bird deterrent, having a base, a center post attached to and extending up from the base, and first and second spinner assemblies having a plurality of fins rotatably attached to the center post. The plurality of fins on the first spinner are angled such that they spin in the opposite direction of the plurality of fins on the second spinner, and the plurality of fins on the first spinner and the plurality of fins on the second spinner are reflective.

Another aspect of the present disclosure includes a reflective bird spinner having a base having a center post extending up from the base, a first spinner assembly rotatably attached to the center post, the first spinner comprising a first set of fins angled such that the first spinner spins in a first direction, a second spinner assembly rotatably attached to the center post and disposed below the first spinner assembly, the second spinner comprising a second set of reflective fins angled such that the second spinner spins in a second direction opposite the first direction.

Still another aspect of the present disclosure includes a method of deterring birds using a reflective bird spinner, including recharging a battery disposed within a base of the reflective bird spinner by exposing a solar panel electrically connected to the rechargeable battery to a source of ambient light, rotating a plurality of reflective fins about a central post that extends from the base, and shining light from a bulb electrically connected to the battery, the light directed toward the plurality of reflective fins creating a dazzling light effect.

These and other aspects, objects, and features of the present disclosure will be understood and appreciated by those skilled in the art upon studying the following specification, claims, and appended drawings.

DETAILED DESCRIPTION OF EMBODIMENTS

Figure 1:
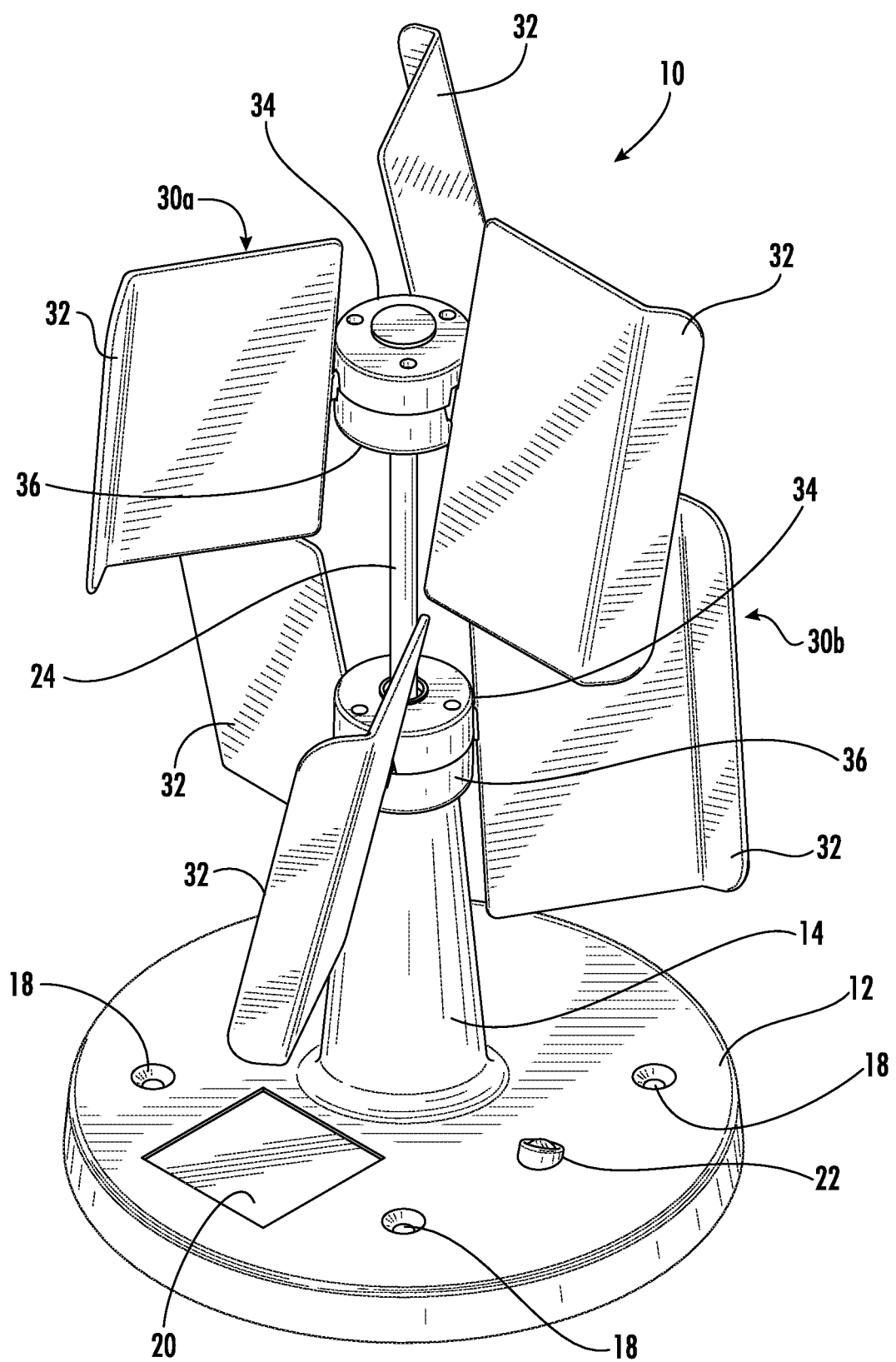
FIG. 1 is a perspective view of an embodiment of a bird spinner.
Figure 2:
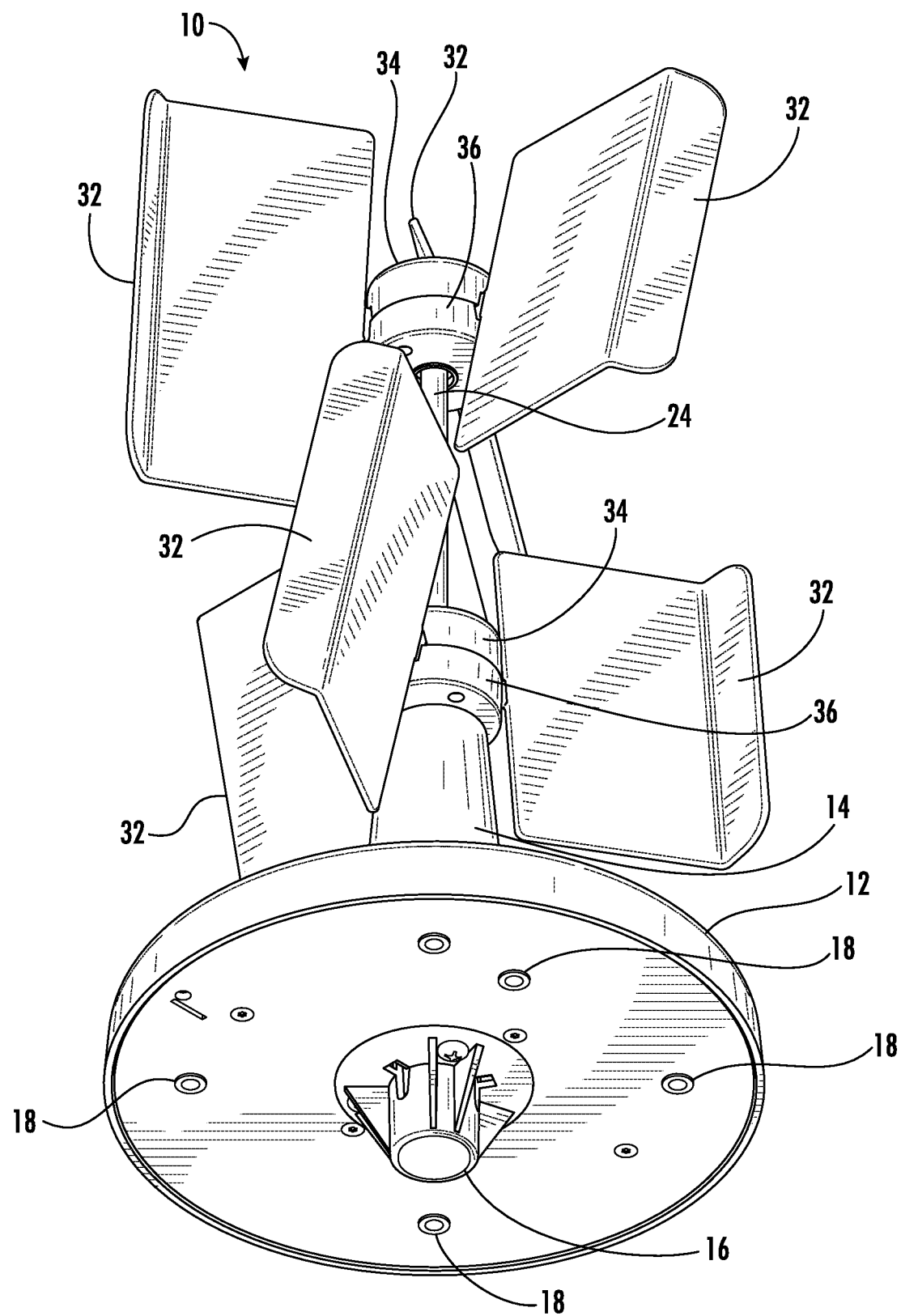
FIG. 2 is a perspective view from the underside of a bird spinner.
Figure 3:
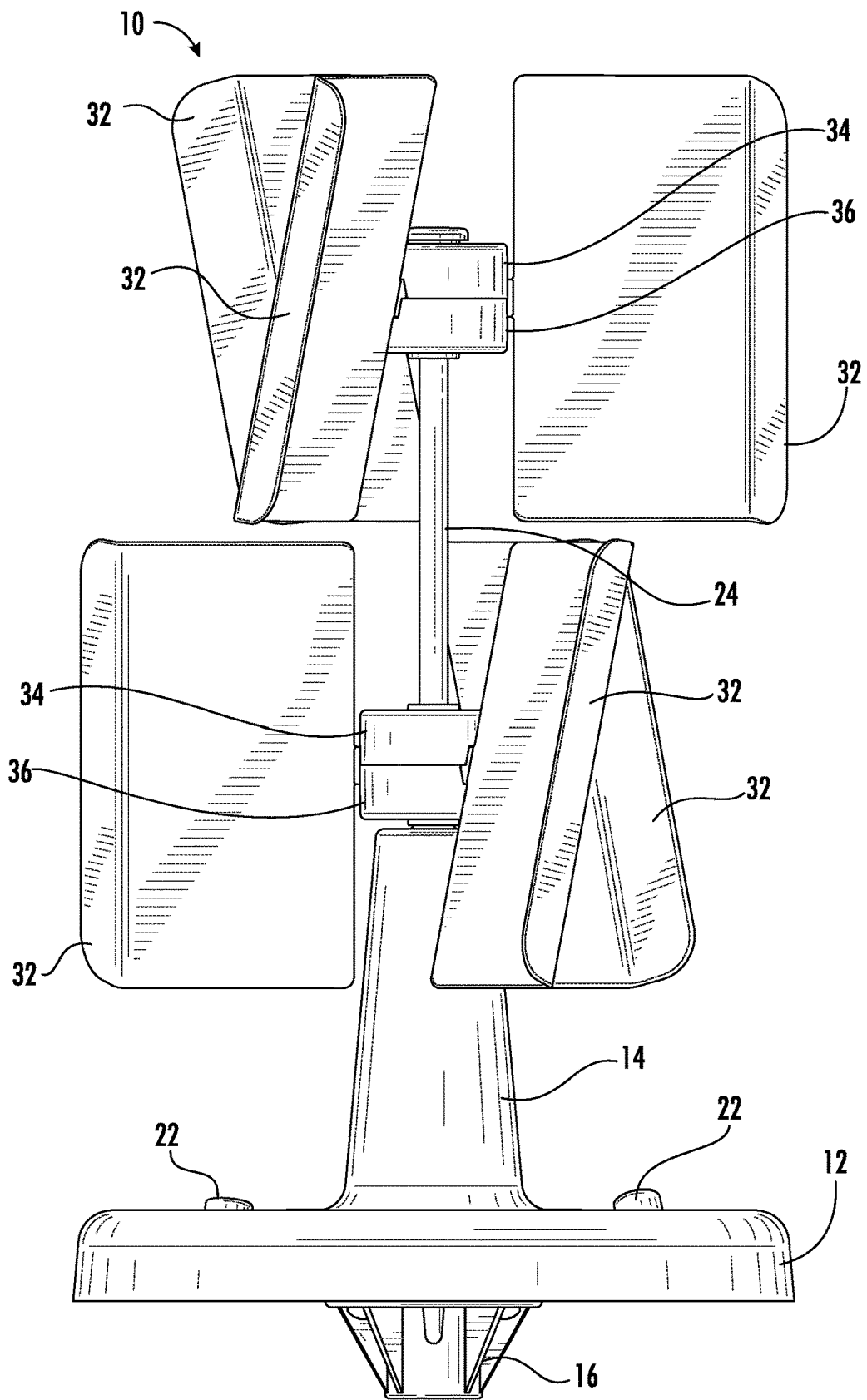
FIGS. 3-6 are front, right side, rear, and left side elevation views of the bird spinner.
Figure 4:
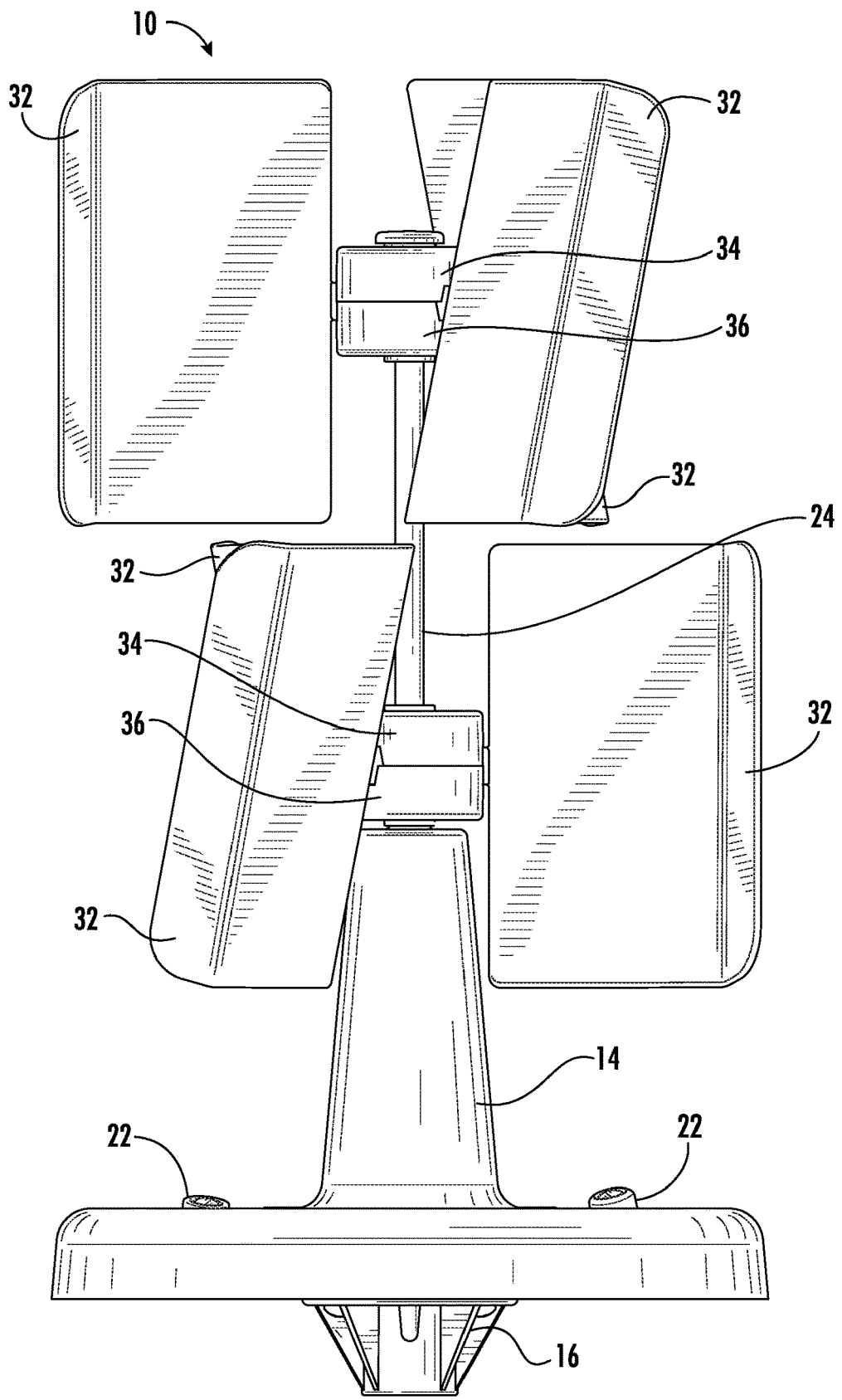
Figure 5:
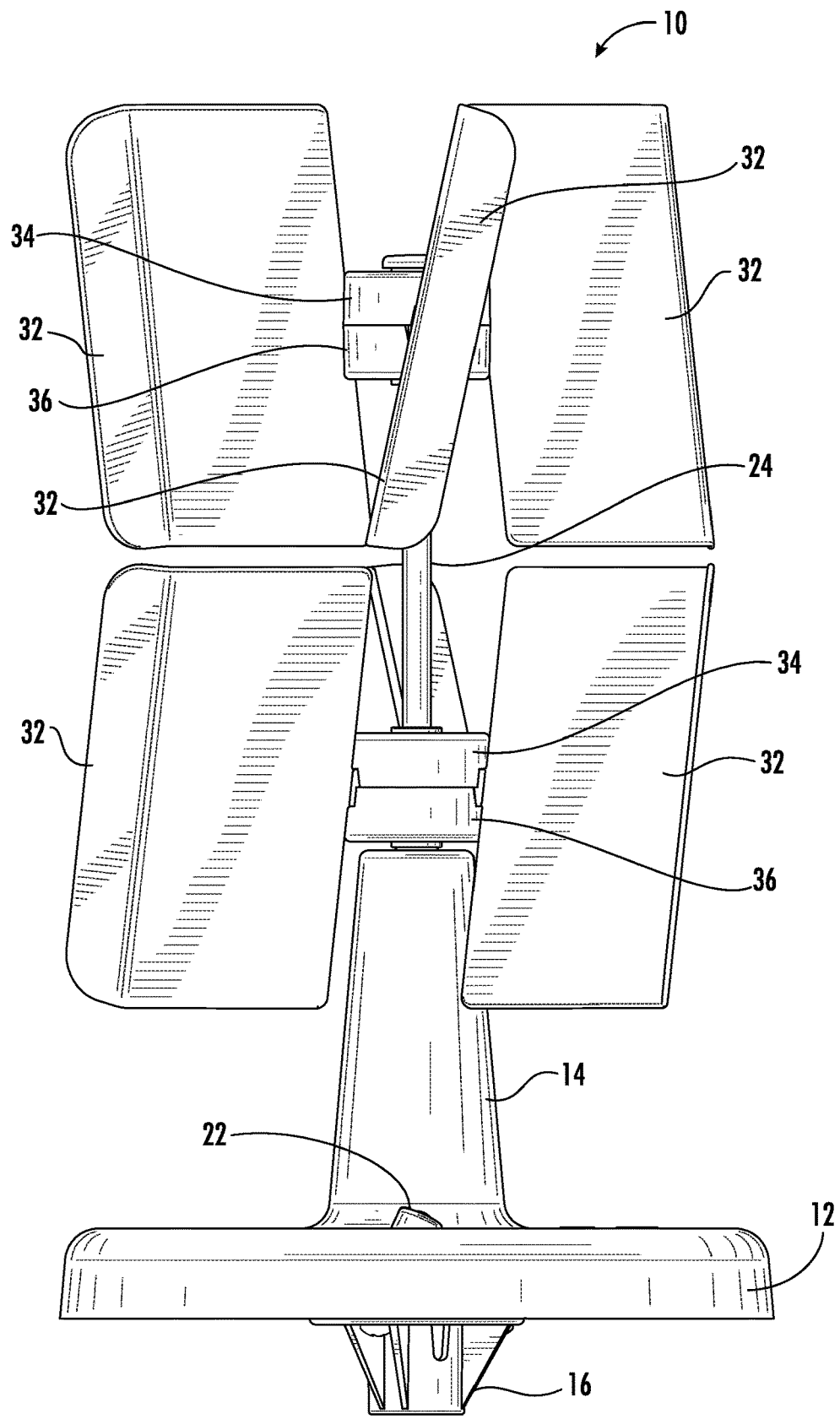
Figure 6:
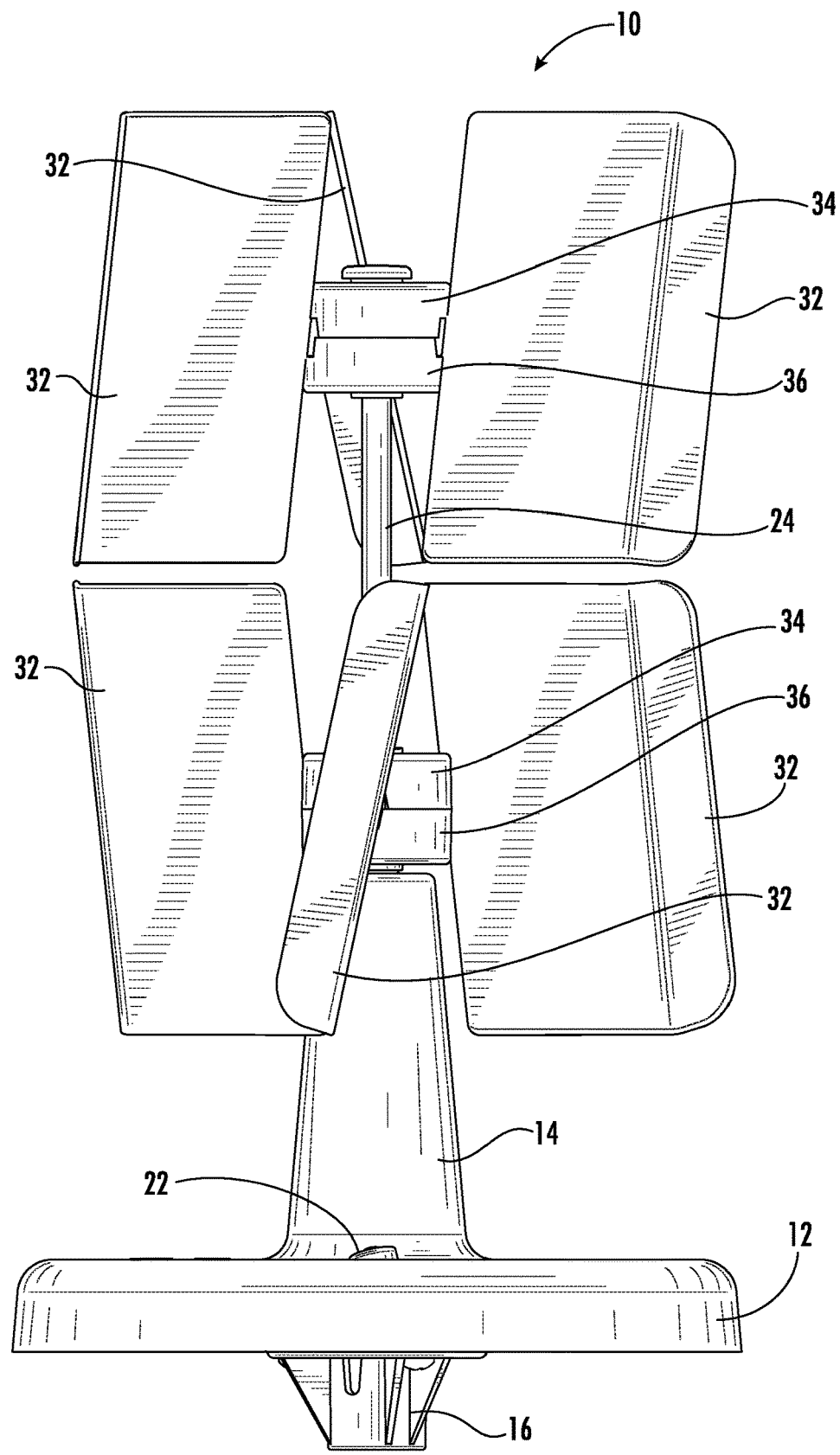
Figure 7:
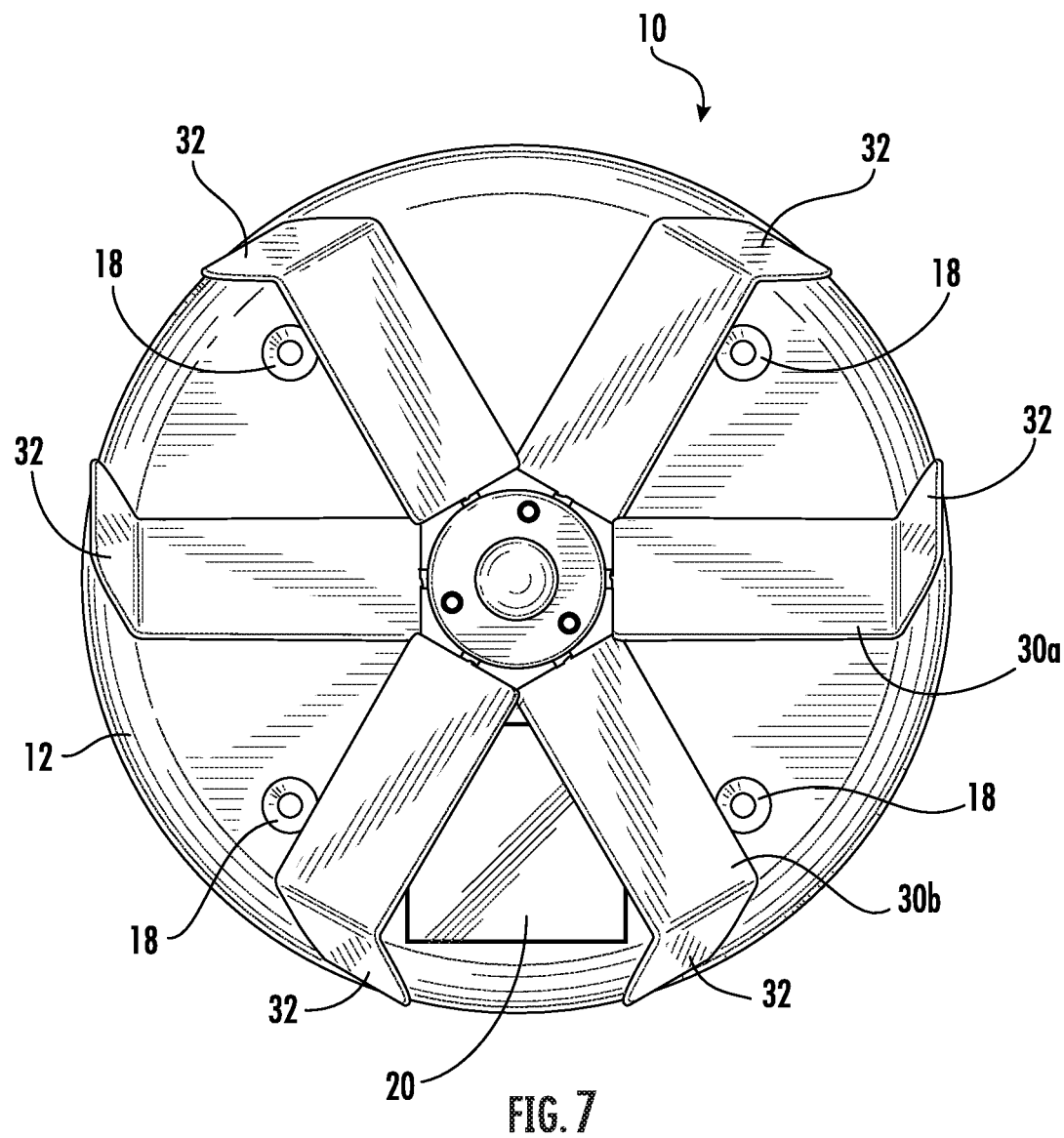
FIG. 7 is plan view of the bird spinner.
Figure 8:
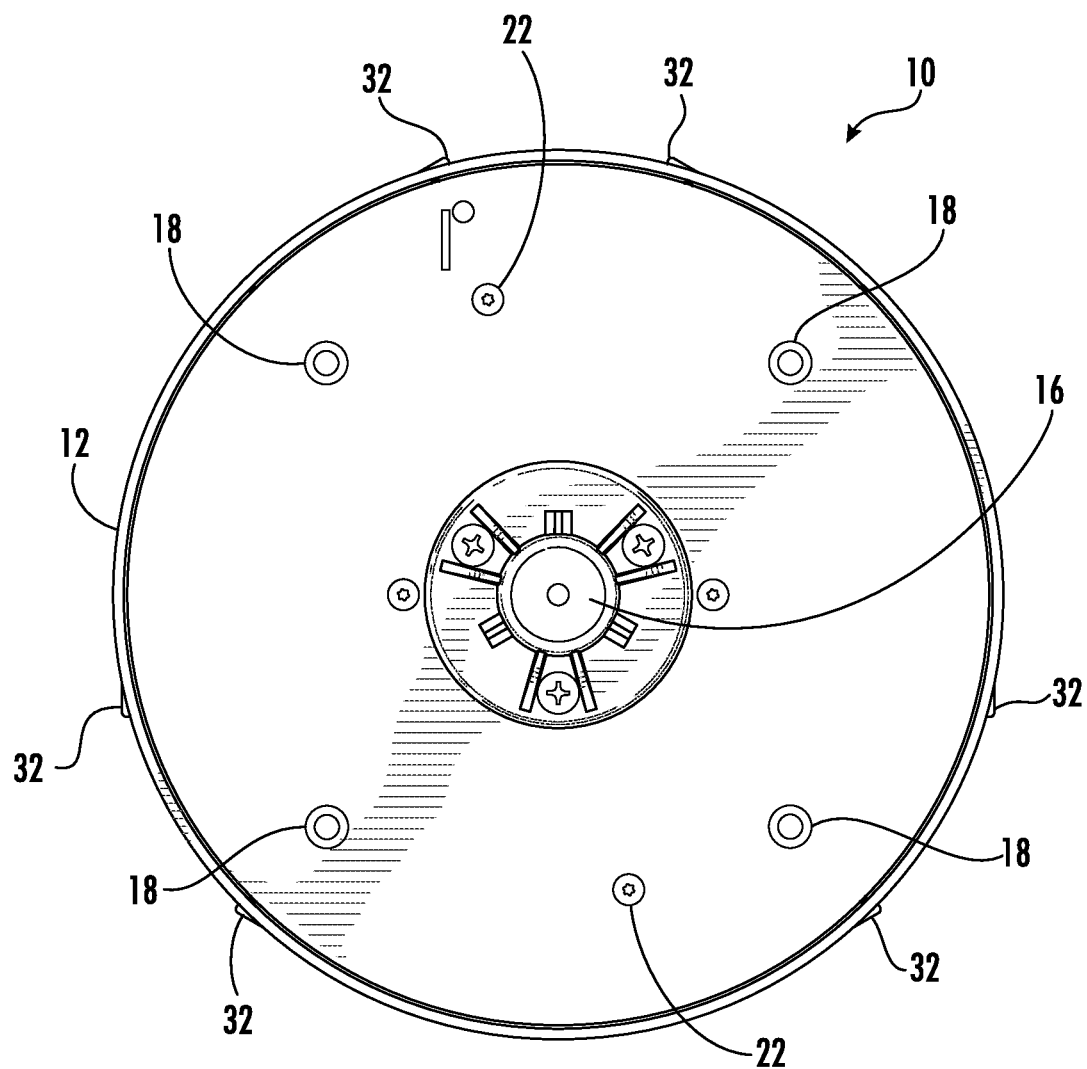
FIG. 8 is a bottom view of the bird spinner.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 is a perspective view of a bird spinner 10. The bird spinner 10 may include a base 12. The base serves two main purposes. The first is to provide the bird spinner with a stable platform to attach the spinner 10 to a wood plank, a stable conduit of some sort, or any other existing structure. The second is to house and protect certain components of the bird spinner as will become apparent to one of ordinary skill.

The base 12 may include a center post 14 that extends above a top portion of the base 12. The base 12 may also include a bottom post 16 to allow the base to be attached to a conduit such as a ½" conduit. The bottom post may be optional, so the post 16 may or may not be attached to the bottom of the base 12. The base may include four screw attachment through-holes 18. The holes 18 may allow the base 12 of the bird spinner 10 to be attached to a wood base, or any other material that may be attached to by screws or the like.

The base may include a battery (not shown). The battery may located within the base 12 and be used to power certain electrical components as will become apparent to one of ordinary skill. Because it may not be easy or efficient to gain access to the inside of the base 12 to replace the battery, a solar panel 20 may be included within the base. The solar panel 20 may have a top side that is exposed through an aperture or a hole in the base 12. The top side of the solar panel 20 and the aperture in the base 12 may be located such that the top side of the solar panel is exposed to a source of ambient light, such as sunlight. Sunlight is one example of ambient light, but the light may come from any other type of light if e.g. the spinner is used in a location that has low exposure to the sun.

The solar panel 20 transforms the light energy into electrical energy as in known in the art. This electrical energy is transferred to the battery, effectively recharging the battery for use in low light situations.

The battery may be electrically connected to a light 22 disposed within the base. The light 22 is energized by the battery which may be recharged by the solar panel 20. In this way, the light is available by the bird spinner for use during times with much light available to the unit, and also times with low or no ambient light available.

The base 12 may include a post housing 14. The post housing 14 may be integral with the base 12 (as shown in the Figures) or may be separately attached to the base in a fashion known in the art. The post housing 14 may provide structural support to a center post 24 that extends upwardly (as oriented in FIG. 1) from the base 12.

Attached to the center post is a spinner assembly 30. The spinner assembly may include connection collars 34 and 36. Connection collar 36 may fixedly attach to the center post 24 and remain stationary with respect to the center post 24. Connection collar 34 may slidably and rotatably attach to collar 36, allowing the collar 34 to freely rotate about the center post 24. In other embodiments, the collars 34 and 36 may be reversed, they may be integral and both may spin about the center post, or may be in any other combination known in the art that allows the spinner assemblies to spin about the center post 24.

A plurality of fins 32 may be attached to collar 34. The fins 32 are designed such that they will spin about the center post 24 in a certain direction if there is any wind, irrespective of the direction the wind is blowing. As shown in FIG. 1, there is shown a first spinner assembly 30a and a second spinner assembly 30b disposed one atop the other. The fins 32 of spinner 30a as oriented in FIG. 1 are configured to spin clockwise, while the fins 32 of spinner 30b are configured to spin counter-clockwise. In other embodiments, the directions of the spinner assemblies 30a and 30b may be reversed, they may spin in the same direction, or there may be any other number of spinner assemblies.

In use, the bird spinner 10 may be placed in an area a user wishes to keep birds or other animals away from. The base 12 may be attached to a fence post, a railing, or any other structure that provides sufficient structure to keep the spinner relatively stable by screwing through the through-holes 18 in the base 12. The base 12 may also be attached to a conduit, such as a ½" conduit, by using a bottom post 16 (optional). The base may also be attached in any other method known in the art.

The unit 10 may be placed such that the solar panel 20 substantially faces a source of ambient light, such as the sun. The solar panel keeps the rechargeable battery energized. The rechargeable battery provides electrical power to the light or lights 22, which are pointed at the fins 32 of the spinner assembly 30 or assemblies 30a, 30b. The fins 32 may be reflective, which provides a dazzling light when placed in the sun and rotating, or when the lights shine on them and they are rotating. This dazzling light has the effect of scaring off birds or other animals.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A method of deterring birds using a reflective bird spinner, the method comprising:
    attaching a post downwardly extending from a base of the reflective bird spinner into a conduit;
    recharging a battery disposed within a base of the reflective bird spinner by exposing a solar panel electrically connected to the rechargeable battery to a source of ambient light;
    rotating a plurality of reflective fins attached to a connection collar slidably resting on a stationary collar fixed on a central post extending upwardly from the base, the stationary collar adjustably fixed at a predetermined height on the central post;
    shining light from a bulb electrically connected to the battery, the light directed toward the plurality of reflective fins creating a dazzling light effect.

2. The method of claim 1, further comprising the steps of:
    rotating a second plurality of reflective fins attached to a second connection collar slidably resting on a second stationary collar fixed on the central post, the second stationary collar adjustably fixed at a second predetermined height on the central post that is different than the predetermined height;
    shining light from a second bulb electrically connected to the battery, the light directed toward the second plurality of reflective fins creating a dazzling light effect.

* * * * *